W. W. WINGER.
DRAFT APPLIANCE.
APPLICATION FILED OCT. 29, 1908.
935,135.
Patented Sept. 28, 1909.
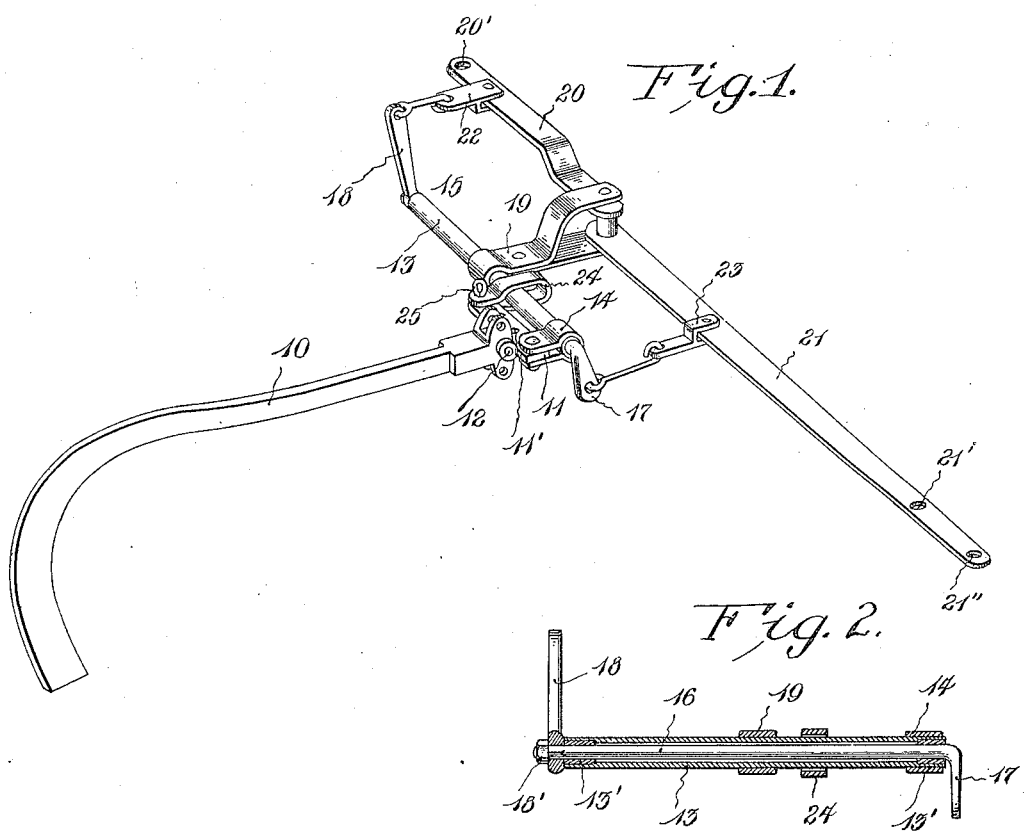

UNITED STATES PATENT OFFICE.

WILLIAM W. WINGER, OF WOLCOTT, INDIANA.

DRAFT APPLIANCE.

935,135.    Specification of Letters Patent.   Patented Sept. 28, 1909.

Application filed October 29, 1908. Serial No. 460,060.

*To all whom it may concern:*

Be it known that I, WILLIAM W. WINGER, a citizen of the United States, residing at Wolcott, in the county of White and State of Indiana, have invented certain new and useful Improvements in Draft Appliances, of which the following is a specification.

This invention relates to draft appliances, whereby a large number of horses may be hitched abreast to any desirable place, such as heavy wagons or agricultural implements.

The invention set forth herein is of the same general nature as that described and claimed in my copending application, Serial No. 434,849, filed May 25, 1908.

The principal object of the present invention is to simplify and generally improve the type of devices hereinbefore referred to.

For a full understanding of the invention reference is to be had to the following detail description and to the accompanying drawings, in which—

Figure 1 is a general perspective view of the improvement in operative position and Fig. 2 is a detail illustrating one manner of journaling the crank in its supporting device.

Throughout the following detail description and on the several figures of the drawings similar parts are referred to by like reference characters.

Referring now particularly to the drawings, the numeral 10 indicates a fragment of a plow beam or any other apparatus to which a large number of horses may be desired to be hitched. The cross head 11 is or may be of conventional construction and pivoted to the forward end of the plow beam by an adjustable pin 12 if desired.

The essential features of this present invention comprise a draft bar 13, which may be of any suitable construction, but herein indicated as being a hollow sleeve or tube, having connection at one end, by means of a clevis 14 rigidly connected thereto, to any one of a series of holes 11' in the aforesaid cross head 11. In this draft bar 13 is journaled a crank 15 consisting of a crank shaft 16 and arms 17 and 18. The arm 17 is preferably shorter than the other and extends erably shorter than the other and extends downwardly preferably while the arm 18 extends upwardly. Rigidly connected to the draft bar at any desirable point intermediate of its ends, preferably at its center, is a fulcrum bar 19 which extends forwardly therefrom. It will be understood that the term "forward" as used in this description will have reference to the direction in which the horses travel. A plurality of draft levers 20 and 21 are pivoted at their adjacent ends to the forward end of the fulcrum bar 19 and from which they extend in opposite directions. The lever 20 is provided with a clevis 22 having linked connection to the upper end of the arm 18, and the lever 21 is provided with a clevis 23 having linked connection with the short arm 17 of the crank 15. This device is intended primarily for the accommodation of four or five horses abreast, although by very slight alterations it may be adapted for more horses or less. In practical operation two or three horses may be hitched to the lever 20 at 20' in any ordinary manner. If two horses are hitched as stated the other two will be hitched to the lever 21 at a hole 21'. If, however, three horses are hitched to the lever 20, the other two horses will be hitched at 21" of the lever 21.

At 24 there is shown a loose guide loop which embraces the draft bar 13 and has pivoted connection at 25 in any suitable hole of the cross head 11. The draft bar has normally play within said loop 24, the latter not being a draft connection between the draft bar and the cross head. The purpose of said loop 24 is to prevent too much pivotal movement of the draft bar and clevis 14 on the pivot by which the latter is connected to the cross head, as in swinging the team around at the turns, and also to prevent any tendency of the weight of the principal parts of the apparatus from twisting the clevis 14.

As indicated in Fig. 2 the crank shaft 16 may be journaled in the draft bar 13 by means of removable and replaceable bushings 13', whereby the wear of the shaft 16 may be kept from the tubular draft bar, the latter for this reason not being required to be of a wear resisting material. The shaft 16 will preferably be introduced into the tubular bar 13 from the end of which the clevis 14 is attached. The end thus introduced through the draft bar will preferably be squared to receive the crank arm 18, which may be held thereon by a nut 18'.

Having thus described the invention, what is claimed as new, is:

1. In a draft appliance, the combination with a cross head, of a draft bar, a clevis secured at one end of said bar and connected to said cross head, said clevis constituting the sole draft connection between the draft bar and cross head, a crank shaft carried by the draft bar and having arms at its opposite ends, one arm being adjacent said clevis and extending from the shaft in an opposite direction from the other arm, a pair of draft levers connected to said arms, respectively, and a fulcrum bar to which said levers are pivoted, said fulcrum bar being secured to the draft bar intermediate the ends of the latter.

2. The combination with a cross head, of a tubular draft bar, a clevis embracing one end of the draft bar and connected to the cross head, a double armed crank journaled in said draft bar, a rigid fulcrum bar secured to the draft bar intermediate of its ends, a pair of draft levers pivoted to the fulcrum bar, and means connecting said levers to the respective crank arms.

3. The combination with a cross head, of a draft bar, a member rigidly connected to the draft bar at the extreme end thereof and pivotally connected to the cross head, a crank shaft of substantially the same length as the draft bar and carried thereby, a pair of crank arms extending from the ends of said shaft in opposite directions, a fulcrum bar connected to the draft bar, and a pair of draft levers connected to the fulcrum bar and the respective crank arms.

4. The combination with a cross head, of a draft bar, means attached to one extreme end of the bar and constituting the sole draft attachment therefor with the cross head, a crank shaft carried by said bar, a short crank arm extending from said shaft adjacent said draft attachment means, a longer crank arm extending from the opposite end of the crank shaft and in a different direction from the shorter arm, a fulcrum bar secured to the middle portion of the draft bar, and long and short draft levers pivoted to the fulcrum bar, the longer lever being connected to the shorter crank arm and the shorter lever to the longer crank arm.

5. The combination with a cross head having a plurality of holes, of a tubular draft bar, a clevis connecting one extreme end of the bar with the cross head through one of said holes and constituting the sole draft connection between the bar and cross head, an equalizing double armed crank journaled in said draft bar, a pair of draft levers connected to said crank arms, a fulcrum bar constituting a connection between the draft levers and the draft bar, and means loosely embracing the draft bar and connected to the cross head through another of said holes, whereby abnormal distortion of the draft bar relatively to the cross head is prevented.

In testimony whereof I affix my signature in presence of two witnesses.

WILLIAM W. WINGER.

Witnesses:
 JOHN ABERSOLL,
 EDWARD BLUME.